United States Patent [19]

Badoureaux

[11] Patent Number: 4,854,345
[45] Date of Patent: Aug. 8, 1989

[54] VALVE COUPLER WITH DECOMPRESSION

[75] Inventor: Jean-Pierre Badoureaux, Haute-Savoie, France

[73] Assignee: Parker Hannifin RAK, Annemasse, France

[21] Appl. No.: 929,257

[22] Filed: Nov. 10, 1986

Related U.S. Application Data

[63] Continuation of Ser. No. 866,023, May 21, 1986, Pat. No. 4,702,278.

[51] Int. Cl.[4] .............................................. F16L 37/28
[52] U.S. Cl. ................................ 137/614.05; 137/614; 251/149.6
[58] Field of Search .......................... 137/614, 614.05; 251/149.6

[56] References Cited

U.S. PATENT DOCUMENTS

| | | | |
|---|---|---|---|
| 3,132,667 | 5/1964 | Baker et al. | 137/614.05 |
| 3,570,543 | 3/1971 | Ekman | 137/614.04 |
| 3,791,411 | 2/1974 | Bogeskov et al. | 137/614.02 |
| 4,200,121 | 4/1980 | Walter et al. | 137/614.05 |
| 4,394,874 | 7/1983 | Walter | 137/614.02 |
| 4,398,561 | 8/1983 | Maldavs | 137/614.05 |
| 4,509,554 | 4/1985 | Failla | 137/614.05 |

FOREIGN PATENT DOCUMENTS 2024539 2/1972 France .

Primary Examiner—A. Michael Chambers
Attorney, Agent, or Firm—Christopher H. Morgan

[57] ABSTRACT

This coupler with valves is of the type which includes an outer tubular body (2), equipped, at one end (2″) with means (3) of rigid connection with a source of fluid under pressure, at the other end of which is made the female fitting (7′) of the coupler, this female fitting (7′), which contains the valve (14), situated on the feed circuit side, being arranged to permit the engagement and the locking, in its bore, of the male fitting (11) of this coupler, which, in turn, contains the valve (13), situated on the side of use of the fluid under pressure. The head of the valve (14), situated on the feed side, has a bore (14a), supporting an auxiliary valve (22), of which the return spring (25) is weaker than that (15) of the main valve (14), and which can be pushed back into open position by the valve (13) of the male fitting (11), as soon as this latter exerts a push against it, this auxiliary valve (22) being arranged so that its opening puts into communication the spaces (28, 31) situated on either side of the seat (18) of the main valve (14).

4 Claims, 2 Drawing Sheets

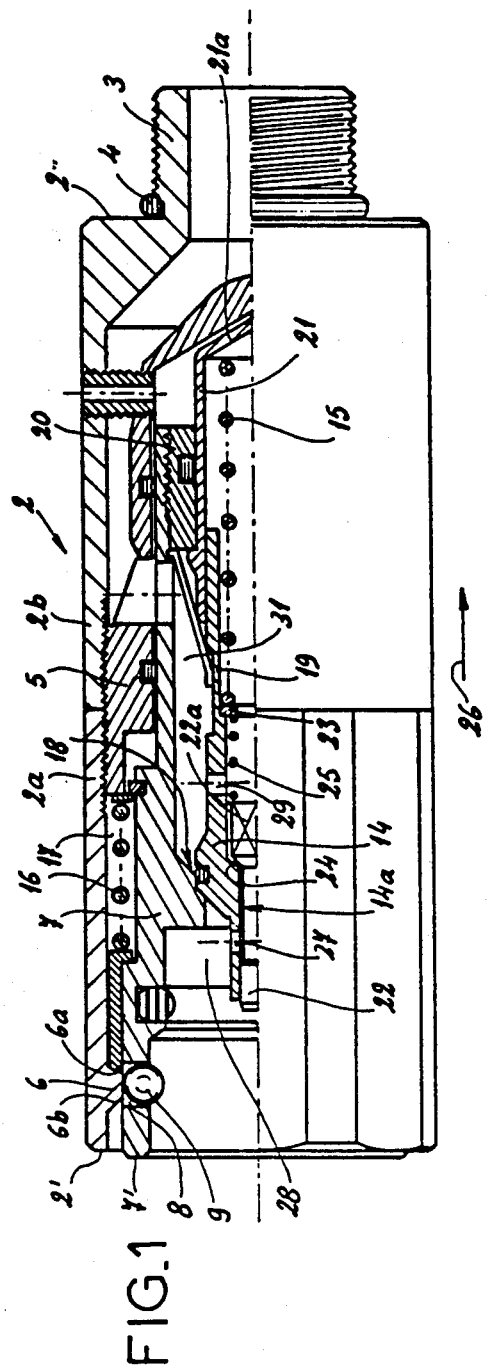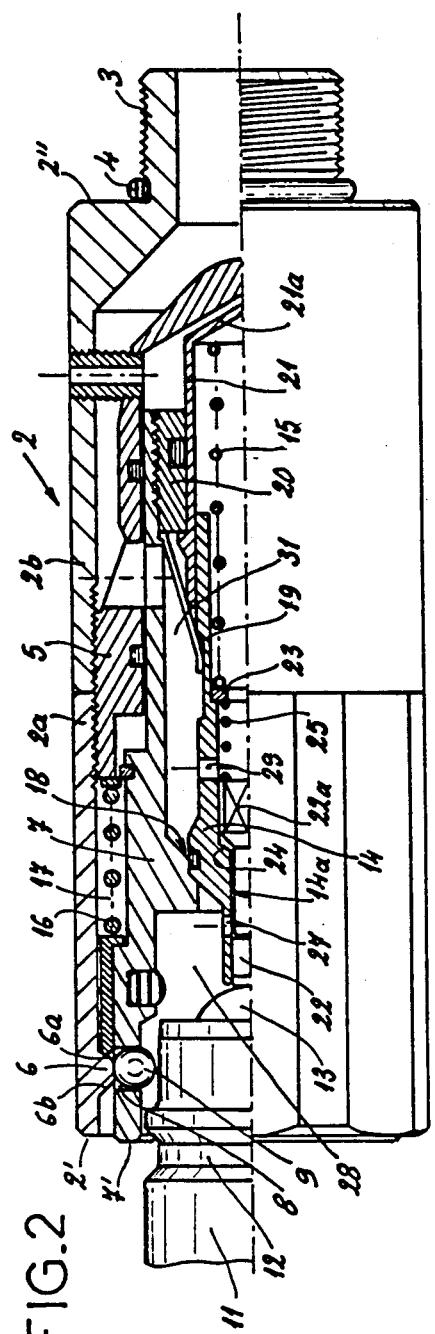

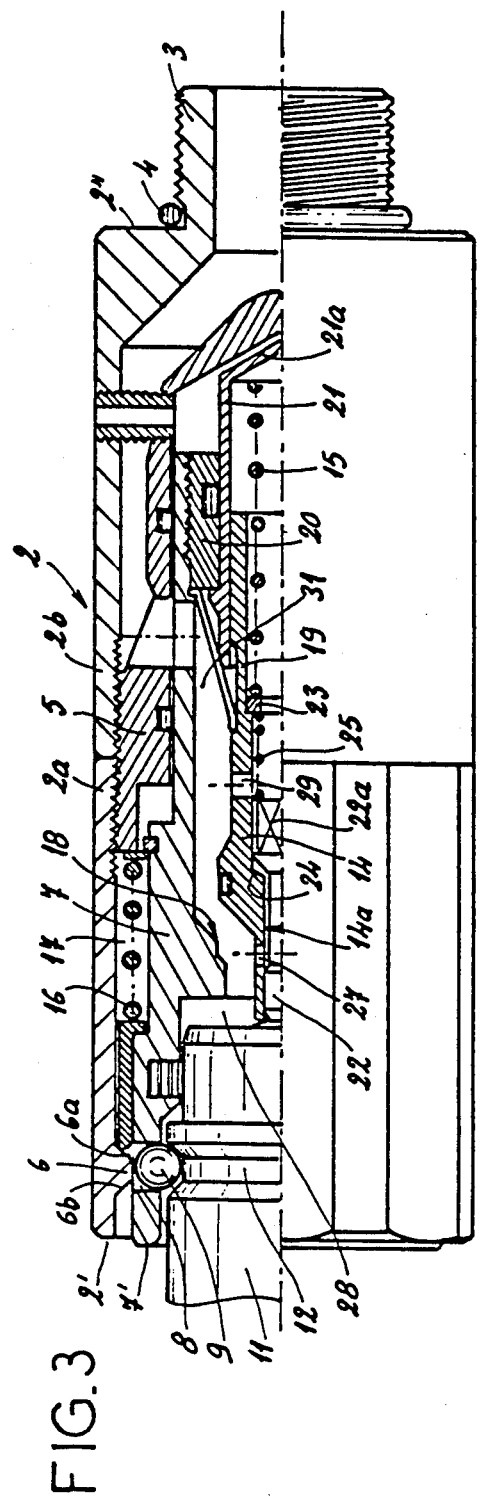

VALVE COUPLER WITH DECOMPRESSION

This invention is a continuation of Ser. No. 06/866,023, filed 5/21/86, now U.S. Pat. No. 4,702,278, issued 10/27/87.

BACKGROUND OF THE INVENTION

This invention relates to a valve coupler with decompression.

Thus, the invention relates to a valve coupler of the type which includes an outer tubular body, equipped at one end with rigid connection means to a source of fluid under pressure, to the other end of which is brought the female fitting of the coupler, and this female fitting, which contains the valve situated on the feed circuit side, being designed to permit the engagement and locking, in its bore, of the male fitting of this coupler which, in turn, contains the valve situated on the user side of the fluid under pressure.

In the connection of the male fitting into the female fitting of such a coupler, it is necessary to prevent the valve situated on the user side, that is, in the male fitting, from opening before that situated on the feed side, namely, in the female fitting. This purpose is usually attained because, generally, there prevails in the user circuit, a residual pressure which assists the return spring of the valve of the male fitting, to maintain it in a closed position. However, this advantage is cancelled if there prevails, in the feed circuit, a residual pressure greater than that of the user circuit, since, in this case, the valve of the user circuit will be opened before that of the feed circuit.

There is known from French patent application No. 69 41086 (Pat. No. 2,024,539), a coupler of this type in which, with the valve of the female element situated on the feed side, is associated an auxiliary valve designed to be opened before the main valves, situated on the feed side and the user side, respectively. This device, by causing a fall of the residual pressure possibly prevailing in the feed circuit, has for its purpose the assuring of the opening of the main valve situated on the feed side before that of the main valve situated on the user side.

To obtain the opening of the auxiliary valve before that of the main valves in the coupler according to this French Patent, the return spring, in the closing position of the auxiliary valve, is chosen stronger than those of the main valves, which are both supposed to be assisted by the high residual pressure which ma prevail upstream of each of them.

The return spring of the auxiliary valve, which is necessarily stronger than those of the main valves, and which must be lodged inside a bore of the main valve situated on the feed side, imposes on this latter a great dimension, and thus, considerably increases the cost of manufacture of this coupler.

Moreover, to engage the male fitting, bearing the main valve, situated on the user side, in the female fitting, if a high residual pressure prevails on the feed side, it is necessary to overcome the force of the return spring, which does not facilitate this engagement.

SUMMARY OF THE INVENTION

The present invention is intended to remedy this difficulty, starting with the principle that a very low feed rate will suffice to cause the residual pressure in the feed circuit to fail. For this purpose, in the coupler concerned, and which is of the type mentioned, the return spring of the auxiliary valve is weaker than that of the main valve, situated on the feed side, with which it is associated, so as to permit it to be pushed into the opening position by the valve of the male fitting, situated on the user side, as soon as this latter pushes against it, and consequently, before the opening of the main valve of the female fitting with which it is associated. Thus, the opening of the auxiliary valve is obtained before that of the two other valves of the coupler, whatever the values of the other residual pressures which may prevail, upstream of one and/or the other of the main valves.

It should be noted also that the return spring of the auxiliary valve has only for its purpose the return of this latter into the closed position, so that its force may be chosen at a very low value. It might also be omitted in case the coupler is used vertically, with the female fitting situated above the male fitting, gravity then playing the part of the return spring into the closed position of the auxiliary valve.

The locking of the male fitting into the female fitting may be obtained first into the second. This advantageous arrangement might also be applied to couplers of the type mentioned, in which the locking of the male fitting into the female fitting is obtained with the aid of locking balls; that is, couplers of the type mentioned in which the outer tubular body lodges a tubular element, movable axially in both directions, and of which the front end, corresponding to the free end of the tubular body, which forms the female fitting of the coupler, bears, in an annular row of perforations, serving them as lodgings, locking balls, designed to be engaged and held in an outer annular hollow provided, for this purpose, near the end of the associated male fitting of the coupler, a return spring tending to bring this tubular element back into an intermediate stable position, in which the annular row of perforations, lodging the locking balls, coincides axially with an internal radial rib with conical sides, of the tubular body, to hold the balls in locking position; that is, in projecting radially to the inside of the bore of the mobile tubular element, and this latter bearing, on the side of its rear end, a valve normally held shut by a spring, and designed to be moved back into open position by the valve of the male fitting when this latter is engaged in the female fitting.

There is known through the French patent application No. 85 07821 of the applicant, a coupler of this type, in which the course of opening of the valve of the feed circuit is temporarily augmented to permit a locking of the male fitting into the female fitting, before the opening of the valve of the user circuit, this opening being commanded by the pressure of the feed fluid, with the opening of the feed circuit.

Naturally, the present invention may also be applied to this type of couplers. In this case, the head of the main valve of the feed circuit has a bore coaxial with its tubular stem and serving as a guide for the stem of the auxiliary valve, and of which the diameter, less than that of the bore of the stem of the main valve, creates a shoulder, forming the seat of the auxiliary valve, of which the head is lodged in the bore of the stem of the main valve, the length of the stem of the auxiliary valve being greater than the length of the bore of the head of the main valve, and radial openings made in the wall of the head and of the stem of the main valve, causing the bore of the head and that of the stem, respectively, to communicate with the spaces of the bore of the mobile tubular element, situated before and after the seat of the main valve.

In any case, the invention will be well understood with the aid of the description which follows, with reference to the attached schematic drawing, showing, by way of example, and without intent to limit, one form of execution of this coupler which, in this example, is of the type with locking by balls.

BRIEF DESCRIPTION OF THE DRAWINGS

FIG. 1 is a lateral view in elevations, with axial half-section, showing the body of this coupler before engagement of the male fitting, with its female fitting at rest, and its main valve and its auxiliary valve in closed position;

FIG. 2 is a view similar to FIG. 1, showing this coupler at the beginning of the engagement of the male fitting, the female fitting still being in normal rest position, with its main valve in closed position, but its auxiliary valve in open position;

FIG. 3 is a view similar to FIGS. 1 and 2, showing the male fitting and the female fitting of this coupler locked together, with the main valve and the auxiliary valve of the female fitting in open position.

DETAILED DESCRIPTION OF THE INVENTION

As the drawing shows, the coupler of the invention is a coupler with valves of a known type, including an outer tubular body (2), provided, at its rear end (2''), with a threaded fitting (3), equipped with a thoric joint (4), permitting its hermetic connection with a source of fluid under pressure, not shown in the drawing.

In the example illustrated in the drawing, for reasons of mounting possibilities, the tubular body (2) is actually composed of two coaxial elements, one in front (2a), the other at the rear (2b), assembled end to end with a threaded inner ring (5).

Near its front end (2'), the tubular body (2) has an inner radial rib (6) with conical sides, one inner (6a) and the other outer (6b), of which the function will be explained later.

Inside the body (2) is mounted, axially mobile in both directions, an inner tubular element (7), of which the front end (7') corresponding to the front end (2') of the body (2), forms the female fitting of the coupler and bears, in an annular row of perforations (8), serving them as lodgings, locking balls (9), normally held in radial projection to the inside of the bore of the front end (7') of the tubular element (7) by the rib (6) of the body (2), the diameter of the balls (9) being greater than the thickness of the wall of the tubular element (7) in the zone of the annular row of perforations (8). It should be noted that each perforation (8) has, at its radially inward end a restriction, opposing the free passage of the balls (9). These balls are designed to lock, in a manner known per se, the male fitting (11) of this coupler, shown in FIGS. 2 and 3, by engagement in a peripheral hollow (12) provided near the free end of the male fitting (11).

With each of the fittings, male (11) and female (7') of this coupler is associated a valve, (13) and (14) respectively, normally held in closed position by a return spring. In the drawing, only the return spring (15) of the valve (14) associated with the female fitting (7') is shown. Each of these valves, (13) and (14), is designed to rest against the other during the engagement of the male fitting (11) in the female fitting (7'), so as to cause its opening and its holding in open position so long as the male fitting (11) remains locked in the female fitting (7').

A spring (16), surrounding the mobile tubular element (7), and consequently, lodged in an annular space (17), separating the tubular element (7) from the body (2), tends to hold this latter in an intermediate stable position, illustrated in FIGS. 1 to 3, in which position the annular rows of perforations (8) coincide axially with the rib (6), and consequently, in which the balls (9) are held by the rib (6) in the radially interior locking position.

For this purpose, the spring (16) rests against two pairs of shoulders, equidistant one from the other, one of these pairs being made on the outer cylindrical surface of the mobile tubular element (7), while the other pair is made on the inner cylindrical surface of the tubular body (2).

As the drawing, and especially FIG. 1 shows, the head of the valve (14), hereinafter called the main valve, of which the seat (18) is made in the bore of the tubular element (7), and of which the tubular stem (19) lodges its return spring (15), has itself a bore (14a), coaxial with the stem (19) and in which is mounted, sliding, an auxiliary valve (22). The bore (14a) of the head of the main valve (14) has a diameter less than that of its stem (19), so that a shoulder (24) results, designed to serve as seat for the head (22a) of the auxiliary valve (22). The return spring (25) tends, normally, to hold the head (22a) of the auxiliary valve (22) resting against its seat (24). In this closed position, the stem of the auxiliary valve (22) has a length which permits it to project beyond the free end of the bore (14a) of the head of the valve (14), so as to be actuated, in the open position, by the valve (14) of the male fitting (11) with the introduction of this latter into the female fitting (7'), before any axial movement of the main valve (14) and of the tubular element (7).

For this purpose, the return spring (25) of the auxiliary valve (22) is less strong than the return spring (15) of the main valve (14), than the return spring (16) of the tubular element (7) and than the return spring, not shown in the drawing, of the valve (13) of the male fitting (11).

In the example shown in the drawing, the rear end of the stem (19) of the main valve (14) is mounted to slide in a sleeve (21), itself mounted to slide in a guide ring (20), borne by the mobile tubular element (7). The return spring (15) of the main valve (14) is compressed between the bottom (21a) of the said sleeve (21) and an inner radial rib (23), formed in the bore of the stem (19) by a circlips. The front surface of this rib (23) serves as rear resting point for the return spring (25) of the auxiliary valve (22).

It should be noted that the wall of the bore (14a) of the head of the main valve (14) has a radial opening (27) or a row of openings, putting this bore (14a) in communication with the space (28) of the bore of the tubular element (7), situated before the main valve (14). On its side, in turn, the wall of the bore of the stem (19) of the main valve (14), has a radial opening (29), or several radial openings, putting this bore in communication with the space (31) of the bore of the mobile tubular element (7) situated behind the main valve (14).

At rest, as shown in FIG. 1, the main valve (14) and the auxiliary valve (22) are in closed position, and no communication is possible between the spaces (28) and (31). As soon as, after introduction of the male fitting (11) into the female fitting (7'), the valve (13) of the male fitting comes in contact with the stem of the auxiliary valve (22), this latter is moved into open position, in the direction of the arrow (26), but without causing the opening of the main valve (14), because of the weakness of the return spring (25) in relation to that of the spring (15). Thus, because of this weakness of the spring (25) in relation to the return spring of the valve (13), this latter can act while remaining in closed position.

In this position, shown in FIG. 2, we see that the fluid can circulate freely between the spaces (28) and (31). As a result, therefore, if, during the connection of this coupler, there prevails, in the feed circuit, that is, between the connection (3) and the space (31), a greater pressure than that prevailing in the user circuit, it is possible, without any harmful result to the operation of this coupler, to cause the pressure of the feed circuit to fall instantly before finishing the connection of the coupler. Namely, as soon as the auxiliary valve (22) opens, as shown in FIG. 2, the fluid under pressure, contained in the space (31), as well as in the part upstream of the feed circuit, being able to flow into the space (28), situated in the female fitting (7'), this pressure of the feed circuit falls instantly, since at this moment, the source of pressure is still insulated from the feed circuit.

The engagement of the male fitting (11) into the female fitting (7'), without opening of the valve (13) of the male fitting (11), can then be normally continued until its locking, with the aid of the balls (9); it suffices for this that the retreat course of the main valve (14) permits it.

In the example shown in the drawing, this retreat course is made possible, at least during the connection of the coupler, by a device according to that described in French patent application No. 85 07821, filed in 1985, of the applicant.

After locking of the male fitting (11) into the female fitting (7') and opening of the feed circuit, the elements of the coupler (2) occupy their normal operation position, as shown in FIG. 3, in which position the three valves, namely, the valve (13) of the male fitting (11), the main valve (14) of the female fitting (7') and the auxiliary valve (22), are in open position.

It is easy to see that, with the retraction of the male fitting (11) out of the female fitting (7'), by simple traction directed outward, that is, in the direction opposite that illustrated by the arrow (26), all the elements lodged in the body (2) of this coupler will resume their normal rest position, as shown in FIG. 1.

I claim:

1. Coupler with decompression valves, of the type including an outer tubular body (2), equipped at one of its ends (2''), with rigid connection means (3) to a source of fluid under pressure, and at the other end, of which is made the female fitting (7') of the coupler, this female fitting (7'), which contains the valve (14), situated on the feed circuit side, and its return spring (15), being arranged to permit the engagement and locking, in its bore, of the male fitting (11) of this coupler, which in turn, contains a valve (13), situated on the user side of fluid under pressure, having a bore (14a), supporting an auxiliary valve (22), so arranged that its opening puts in communication the spaces (28) and (31), situated on either side of the seat (18) of the main valve (14), and being constantly subject to the action of a return spring (25) in closed position, with the distinction that the return spring (25) of the auxiliary valve (22) is weaker than that of the main valve (14), so as to permit it to be pushed back into the open position by the valve (13) of the male fitting (11) as soon as this latter exerts a push against it, and consequently, before the opening of the main valve (14).

2. Coupler according to claim 1, with the distinction that the male fitting (11) is locked into the female fitting (7') be locking balls (9).

3. Coupler with valves according to claim 2, of the type in which the outer tubular body (2) houses a tubular element (7), movable axially in both directions, and of which the front end (7'), corresponding to the free end (2') of the tubular body (2), which forms the female fitting of the coupler, bears, in an annular row of perforations (8), serving them as lodging, locking balls (9), designed to be engaged and held in an outer annular hollow (12), provided, for this purpose, near the end of the male fitting (11) associated with the coupler, a return spring (16) tending to bring back this tubular element (7) into a stable intermediate position in which the annular row of perforations (8) lodging the locking balls (9), coincides axially with an inner radial rib (6), with conical sides (6a, 6b) of the tubular body (2), to hold the balls (9) in locking position; that is, projecting radially to the inside of the bore of the mobile tubular element (7), and this latter bearing, toward its rear end, a valve (14), normally held shut by a return spring (15) and designed to be pulled back into open position by the valve (13), lodged in the male fitting (11), when this latter is engaged in the female fitting (7'), with the distinction that the head of the valve (14), situated on the feed circuit side, of which the seat (18) is made in the bore of the mobile tubular element (7), and of which the stem (19) is tubular, bears an auxiliary valve (22) of which the return spring (25) is weaker than that (15) of the main valve (14), and which can be pushed back into open position by the valve (13) of the male fitting (11), as soon as this latter exerts a push against it, this auxiliary valve (22) being so arranged that its opening puts in communication the spaces (28, 31) of the bore of the mobile tubular element (7), situated on either side of the seat (18) of the main valve (14).

4. Coupler according to claim 3, with the distinction that the head of the main valve (14) of the feed circuit has a bore (14a), coaxial with its stem (19), serving to guide the stem of the auxiliary valve (22) and of which the diameter, less than that of the bore of the stem (19) of the main valve (14), creates a shoulder (24), forming the seat of the auxiliary valve (22), of which the head (22a) is lodged in the bore of the stem (19) of the main valve (14), the length of the stem of the auxiliary valve (22) being greater than the length of the bore (14a) of the head of the main valve (14), and radial openings (27, 29), made in the wall of the head and of the stem (19) of the main valve (14), putting the bore (14a) of the head, and that of the stem (19), respectively, into communication with the spaces (28, 31) of the bore of the mobile tubular element, situated before and behind the seat (18) of the main valve (14).

* * * * *